US005618055A

United States Patent [19]
Mulholland

[11] Patent Number: 5,618,055
[45] Date of Patent: Apr. 8, 1997

[54] STANDER

[75] Inventor: Lawrence K. Mulholland, Santa Paula, Calif.

[73] Assignee: Mulholland Designs, Inc., Santa Paula, Calif.

[21] Appl. No.: 426,154

[22] Filed: Apr. 21, 1995

[51] Int. Cl.$^6$ .......... B62B 3/02
[52] U.S. Cl. .......... 280/641; 602/5; 297/DIG. 4; 297/DIG. 10; 180/907
[58] Field of Search .......... 280/87.041, 641, 280/642, 648, 651, 657, 658; 180/907; 602/5; 297/DIG. 4, DIG. 10, 4, 5, 6; 5/86.1, 610, 81.1; 128/871

[56] References Cited

U.S. PATENT DOCUMENTS

| | | | |
|---|---|---|---|
| 4,029,089 | 6/1977 | Mulholland | 128/80 R |
| 4,390,076 | 6/1983 | Wier et al. | 180/907 |
| 4,456,086 | 6/1984 | Wier et al. | 180/907 |
| 4,744,578 | 5/1988 | Stearns | 280/47.16 |
| 4,802,542 | 2/1989 | Houston et al. | 180/907 |
| 4,809,804 | 3/1989 | Houston et al. | 180/907 |
| 5,265,689 | 11/1993 | Kauffmann | 180/65.5 |
| 5,366,036 | 11/1994 | Perry | 180/907 |
| 5,489,258 | 2/1996 | Wohnsen et al. | 180/907 |

*Primary Examiner*—Richard M. Camby
*Attorney, Agent, or Firm*—Gene W. Arant

[57] ABSTRACT

A stander has a collapsible supporting base including a generally U-shaped frame with a horizontal bar that forms its middle section, and a T-shaped frame having a central extremity which is secured to the bar of the U-shaped frame, the two legs of each frame being adapted to rest upon a flat supporting surface and the two frames being foldably secured together and normally separated by about ninety degrees; and an elongated center post assembly for supporting the body of a person in essentially parallel relation, the center post assembly having a head support end and a foot support end, and having a mid-point pivotally secured to the horizontal bar; and adjustable piston means extending beneath the bar and coupling the T-shaped frame to the center post assembly so that the center post assembly may be rotated by more than ninety degrees between an essentially vertical orientation in which its foot support end is lowermost, and an inclined position in which the elevation of its foot support end is higher than the elevation of its head end.

10 Claims, 4 Drawing Sheets

STANDER

BACKGROUND OF THE INVENTION

The use of stander apparatus is well known in the treatment of people with serious physical handicaps that adversely affect their structural or motor capabilities.

This kind of apparatus typically includes a center post assembly that normally extends vertically and has a foot support at its lowermost end. Other supports are associated with the center post assembly for supporting the person's knees, hips, and chest, so as to support the person's entire body essentially in parallel relation to the center post assembly. The center post assembly is supported from a supporting base and is also inclinable to different angles with respect to the base. Apparatus of this type may be referred to as a prone stander, because of its ability to support a person in either a vertically erect position or a horizontally prone position.

This type of apparatus is widely used for helping children with cerebral palsy. It may also be used for other types of disabilities, and for the treatment of adults as well.

Some patients who have serious lung congestion problems may be advantageously treated by supporting them in a prone position but with the feet at a higher elevation than the head. This provides an opportunity for what is termed postural drainage. Apparatus available in the present state of the art has not effectively addressed that particular problem.

Portability of the apparatus is also of great importance, particularly when used with children.

PRIOR ART

Pertinent prior art includes my U.S. Pat. No. 4,029,089 issued Jun. 14, 1977, and references cited therein.

SUMMARY OF THE INVENTION

According to one feature of the present invention the supporting base includes a horizontal bar elevated above the floor by at least about half the length of the center post assembly. The center post assembly, at a mid-point thereof, is pivotally secured to the horizontal bar so that the center post assembly may be rotated by more than ninety degrees. This allows supporting the body of the person either in an essentially vertical orientation with head up and feet down, or in an inclined position in which the elevation of the feet is above the elevation of the head, thus accommodating postural drainage. The angle of inclination of the center post assembly in that position is preferably at least ten degrees from horizontal.

According to another feature of the present invention the supporting base includes a generally U-shaped frame and a generally T-shaped frame which are hingedly secured to each other and may be folded together for easy transport of the stander when it is not being occupied.

According to the presently preferred embodiment of the invention both of the above features are integrated into a single structure which is easy to use, to fold up, and to transport, and which is also economical to manufacture.

DESCRIPTION OF PREFERRED EMBODIMENT

FIGS. 1–4

Figure 1:
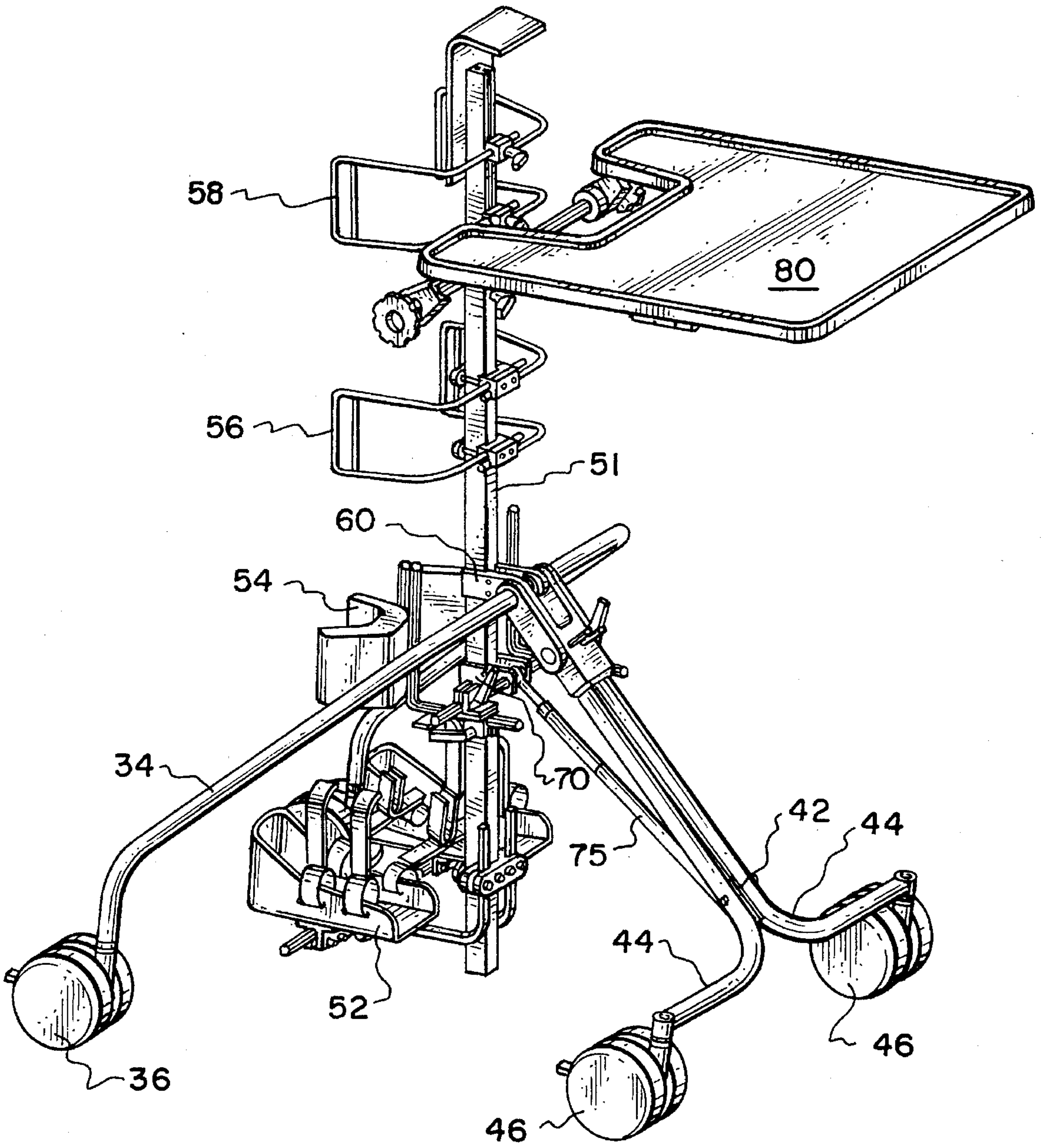
FIG. 1 is a perspective view of the presently preferred form of the invention ready for use, with the center post assembly extending vertically and the foot rest at its bottom end.

Referring now to the drawings, the stander 10 includes a collapsible base assembly 20 which includes a generally U-shaped frame 30 and a generally T-shaped frame 40. A horizontal bar 32 forms a middle section of frame 30.

A center post assembly 50 is elongated and includes a center post 51. The center post has mounted thereon a set of foot and body supports including a foot rest 52, knee supports 54, hip supports 56, and chest supports 58, all of conventional design and which are adjustable, as well known in the art. There is also a tray 80 that may be folded down. At a mid-point of its length, intermediate to the knee supports 54 and hip supports 56, a pair of parallel plates 60 are fixedly attached to the center post 51 for for pivotally securing it to horizontal bar 32.

U-shaped frame 30 has two laterally spaced legs 34 with floor-engaging extremities to which wheels 36 are attached. The horizontal bar 32 is elevated above the floor by at least about half the length of the center post assembly.

Figure 2:
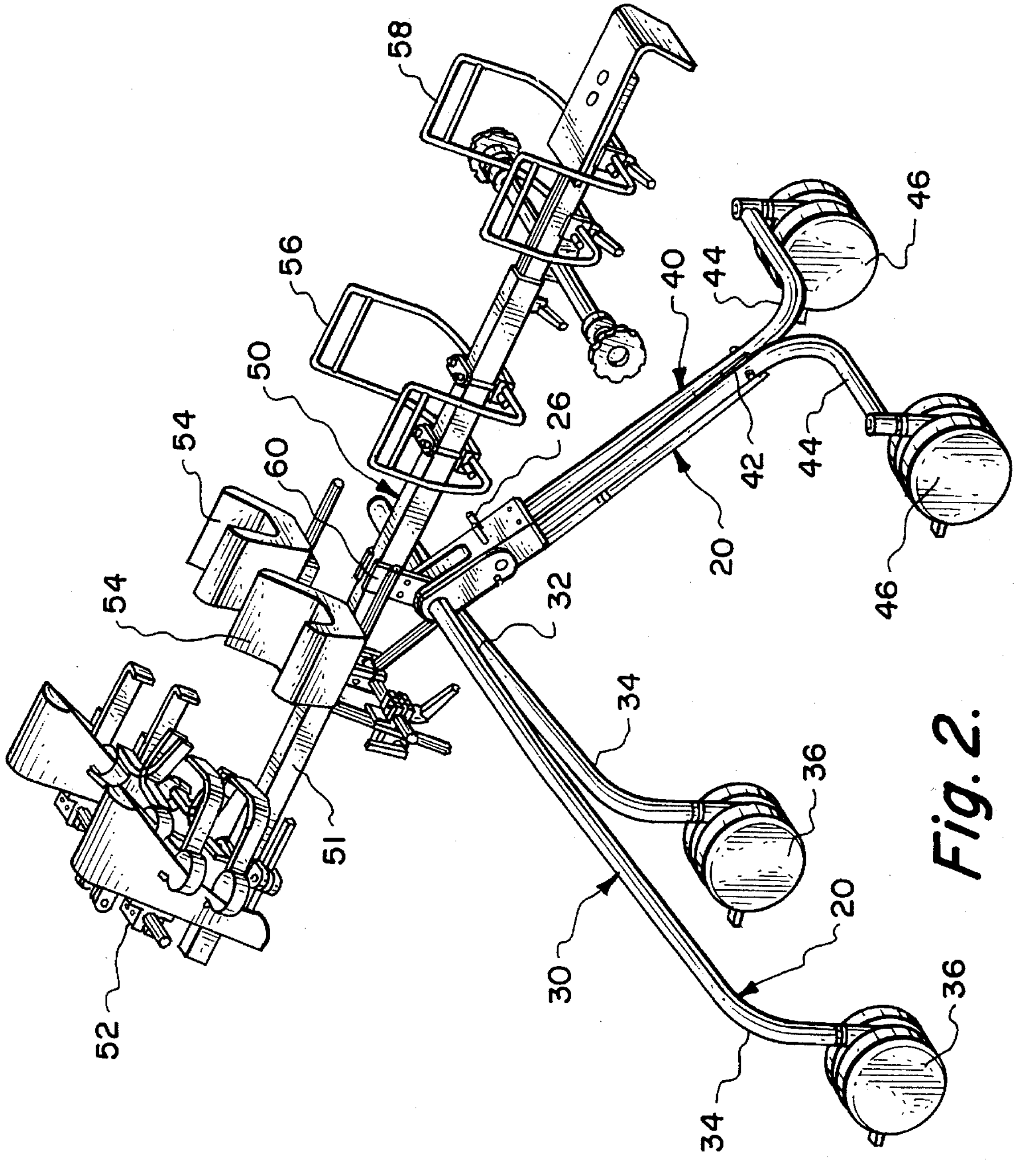
FIG. 2 is a perspective view showing the center post assembly inclined to a substantially horizontal position.
Figure 3:
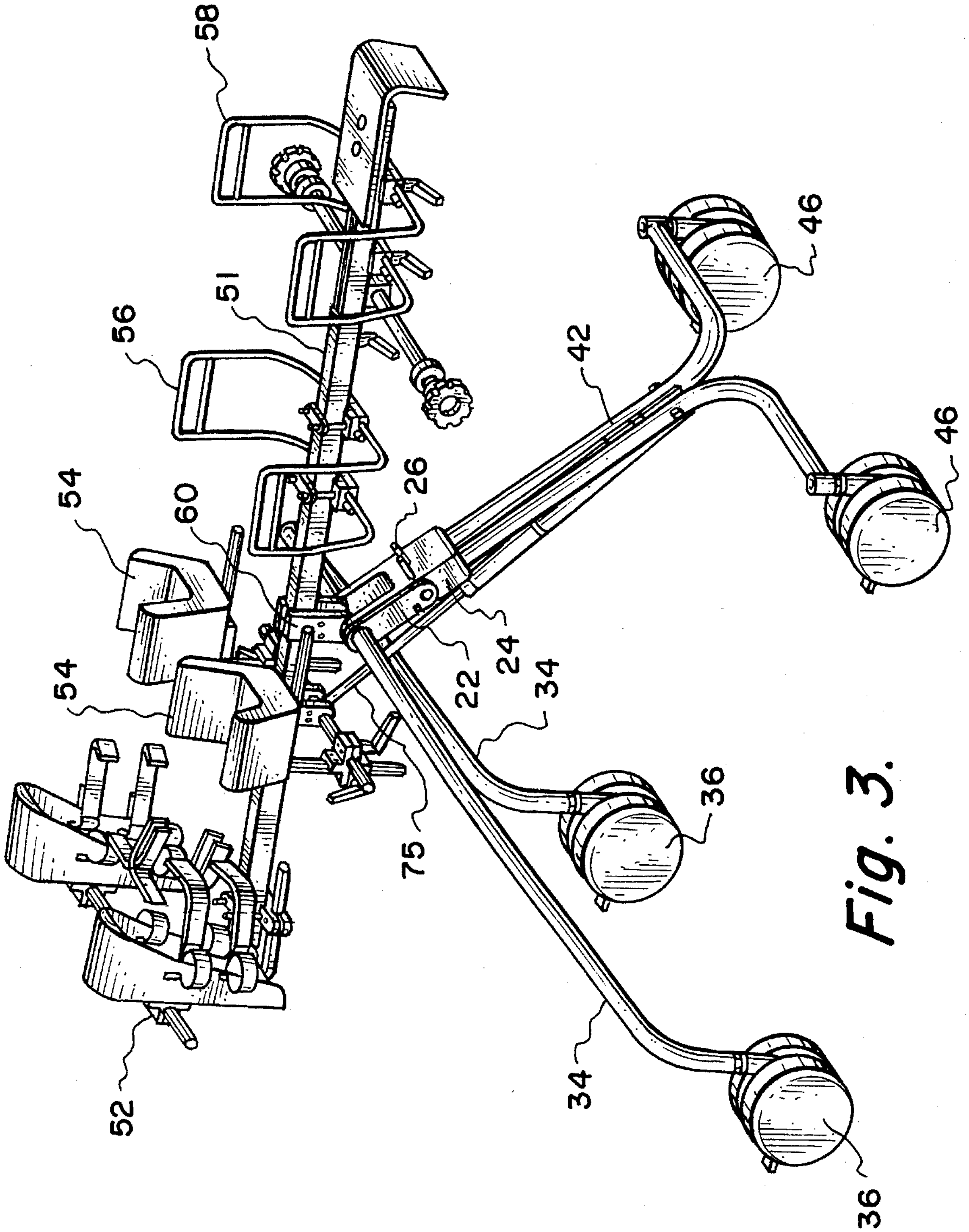
FIG. 3 is a perspective view showing a position in which the center post assembly is further inclined by more than ten degrees, with the foot rest end being elevated above the upper end of the center post assembly.

The generally T-shaped frame 40 has a central section 42 and two arms 44 with floor-engaging extremities to which wheels 46 are attached. The extremity of central section 42 of T-shaped frame 40 is secured to the horizontal bar 32 to normally provide a separation angle between the two frames of about ninety degrees, as best seen in FIGS. 2 and 3. This separation angle provides adequate spacing of wheels 36 and 46 for supporting both the stander and the body of the person resting upon it.

Figure 4:
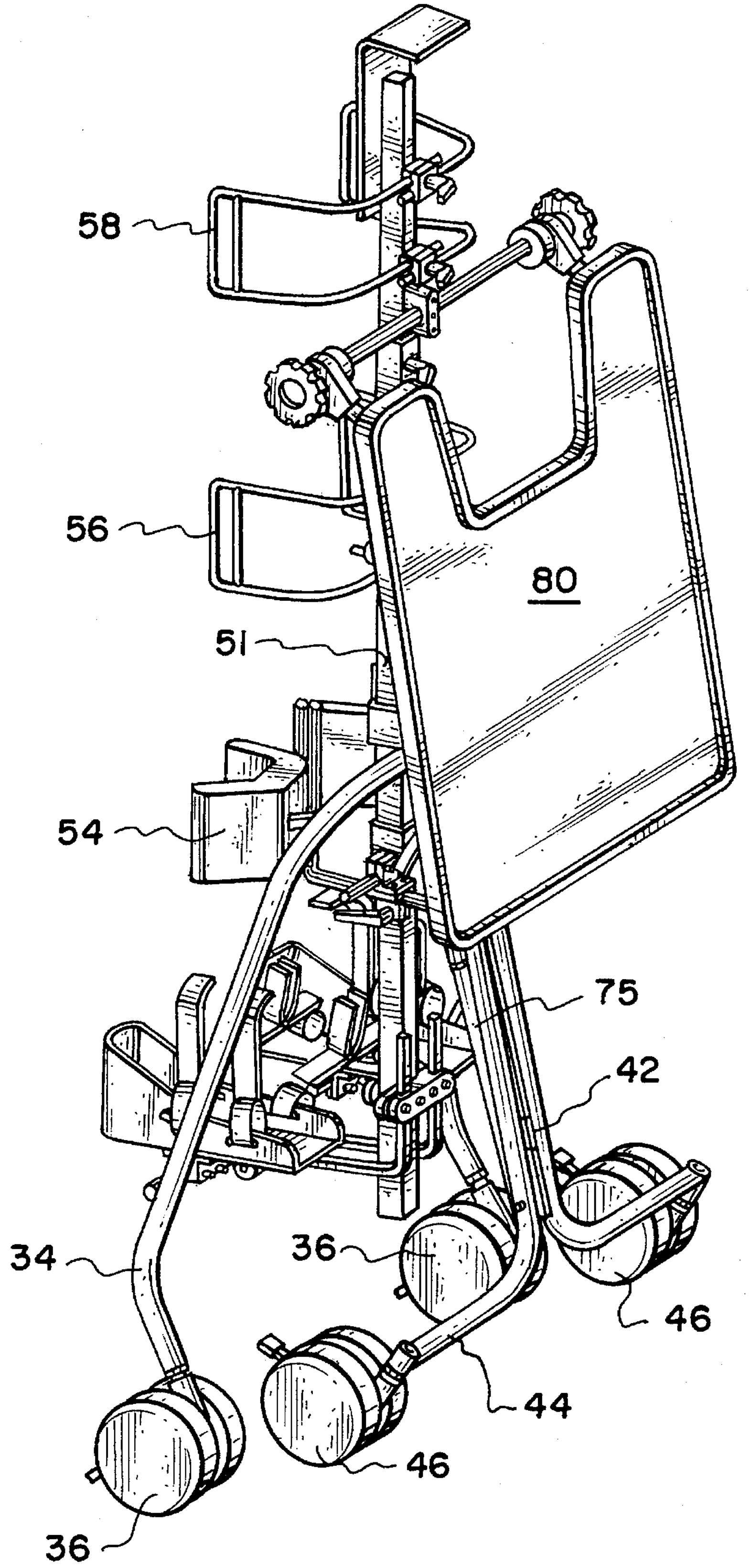
FIG. 4 is a perspective view of the apparatus with the center post assembly extending vertically and the two frames of the supporting base being partially folded together.

A pair of parallel outer plates 22 have one of their ends fixedly attached, as by welding, to the horizontal bar 32. A pair of parallel inner plates 24 are fixedly attached on opposing sides of the extremity of the central section 42 of frame 40. An inner latch mechanism, not specifically shown, normally keeps the two pairs of plates locked in parallel relationship. However, handles 26 of the latch mechanism permit manual disengagement of the latch so that the inner plates can rotate with respect to both bar 32 and the outer plates 22. Thus, the latch with its handles 44 provides a means for selectively adjusting the angular relation of T-shaped frame 40 to U-shaped frame 30. This action is shown in FIG. 4 when collapsible frame 20 is to be collapsed for purpose of transport.

MODE OF OPERATION

When a person is being supported on the stander the latch mechanism normally keeps the frames 30, 40, separated by an angle of about ninety degrees. In this condition of the supporting base the center post 51 may be held precisely erect, precisely horizontal, or tilted in either direction from the horizontal by ten degrees or more. Since the support plates 60 are at about the longitudinal center of the center post 51 it follows that the center of gravity of the body of the person being supported by the apparatus is rather evenly balanced with respect to the axis of rotation provided by the bar 32.

A movable clasp 70, which is the support for the knee block 54, engages the center post 51. A piston 75 has one of its ends pivotally secured to the movable clasp 70 while its other end is pivotally secured to the center section 42 of T-frame 40 adjacent to the juncture of the arms 44. The extension of the piston 75 is controlled by means not specifically shown, as such mechanisms are well known in the art. Depending upon the extension of the piston 75, the center post 51 will occupy any of the positions shown in FIGS. 1, 2, and 3, or any intermediate position.

It will be understood that the apparatus can be adjusted to suit the needs of the individual patient by adjusting the longitudinal position of clasp 70 on center post 51. Although plates 60 fixedly grasp the center post 51 so that they cannot rotate relative thereto, they are preferably also slidable longitudinally of the post. By adjusting the positions of both the plates 60 and the clasp 70 the needs of the individual patient can be well accommodated.

When the apparatus is not being used and is to be transported, piston 75 is withdrawn to its most retracted position, as shown in FIG. 4. The latch release handles 26 are actuated so as to permit T-frame 40 to fold inwardly relative to U-frame 30. The lateral separation of wheels 46 is preferably less than the lateral separation of wheels 36 so that the entire apparatus can be folded up to the maximum extent.

It will be appreciated that the rotatable movement of the center post assembly to permit postural drainage, and the folding of the collapsible frame of the present invention to permit easy transport, are advantageously utilized together in the presently preferred embodiment of the invention, but that the apparatus may if desired be modified to utilize only one of those features without the other. Further, there are other modifications that will be apparent to those skilled in the art, all within the spirit and concept of the present invention.

Although the presently preferred form of the invention has been disclosed in considerable detail in order to comply with the requirements of the patent laws, it will nevertheless be understood that the scope of the invention and of the legal protection to be granted hereby, are to be determined only in accordance with the appended claims.

What I claim is:

1. A stander comprising:

an elongated center post assembly having means to support the body of a person upon it in essentially parallel relation, and having a foot support end;

a supporting base including a generally U-shaped bar that supports a horizontal bar elevated above the floor by at least about half the length of the center post assembly; and said center post assembly at a mid-point thereof being pivotally secured to said horizontal bar so that said center post assembly may be rotated by more than ninety degrees between an essentially vertical orientation in which its foot support end is lowermost, and an inclined position in which the elevation of its foot support end is higher than the elevation of its other end.

2. A stander as in claim 1 wherein said generally U-shaped portion of said supporting base including two legs with floor-engaging extremities;

said center post assembly in its essentially vertical orientation having its said foot support end located intermediate to said legs of said base portion.

3. A stander as in claim 1 wherein said center post assembly includes separate knee and hip supports, said center post assembly being pivotally secured to said horizontal bar intermediate to said knee and hip supports.

4. In a prone stander having a supporting base; a center post assembly which is supported from the supporting base and normally extends vertically but is selectively inclinable to different angles with respect to the base; and foot and body supports mounted upon the center post assembly; said supporting base being of an improved collapsible form, comprising:

a generally U-shaped frame having a middle section to which said center post assembly is secured, and two legs with floor-engaging extremities;

a generally T-shaped frame having a central section, and two arms with floor-engaging extremities;

means fastening the extremity of said central section of said T-shaped frame to said middle section of said U-shaped frame in a predetermined angular relation so that said extremities of said legs and arms are normally in a spaced relation for supporting the stander as well as a person resting thereon; and means for selectively adjusting the angular relation of said T-shaped frame to said U-shaped frame so that said two frames may be folded together for easy transport of the stander when it is not being occupied.

5. A stander as in claim 4 wherein said arms of said T-shaped frame have a maximum expanse which is less than the separation distance between said extremities of said U-shaped frame, whereby said T-shaped frame may be essentially folded inside said U-shaped frame.

6. A stander as in claim 4 wherein the floor-engaging extremities of at least one of said frames includes wheels.

7. A stander as in claim 4 which includes releasable latch means associated with said fastening means for allowing the angular relation of said T-shaped frame to said U-shaped frame to be selectively adjusted.

8. A stander as in claim 4 wherein said body supports include knee supports and a movable clasp that supports said knee supports, and wherein said adjusting means includes an extendible piston having one of its ends pivotally secured to said movable clasp and its other end pivotally secured to the center section of said T-shaped frame.

9. A stander comprising:

an elongated center post assembly having means to support the body of a person upon it in essentially parallel relation, and having a foot support end;

a collapsible supporting base including a generally U-shaped frame and a generally T-shaped frame, said U-shaped frame having a horizontal bar forming its middle section, and said T-shaped frame having a central extremity secured to said bar so that said two frames are normally separated by about ninety degrees;

said horizontal bar being elevated above the floor by at least about half the length of the center post assembly;

said center post assembly at a mid-point thereof being pivotally secured to said horizontal bar;

adjustable piston means extending beneath said bar and coupling said T-shaped frame to said center post assembly so that said center post assembly may be rotated by more than ninety degrees between an essentially vertical orientation in which its foot support end is lowermost, and an inclined position in which the elevation of its foot support end is higher than the elevation of its head end; and means for adjusting the securement of said T-shaped frame to said U-shaped frame so that said two frames may be folded together for easy transport of the stander when not occupied.

10. A stander comprising:

a collapsible supporting base including a generally U-shaped frame with a horizontal bar that forms its middle section, and a T-shaped frame having a central extremity that is secured to said horizontal bar of said U-shaped frame, each said frame having two legs adapted to rest upon a flat supporting surface, said two frames being foldably secured together;

an elongated center post assembly for supporting the body of a person in essentially parallel relation, said center post assembly having a head support end and a foot support end, and having a mid-point pivotally secured to said horizontal bar; and adjustable piston means extending beneath said horizontal bar and coupling said T-shaped frame to said center post assembly so that said center post assembly may be rotated by more than ninety degrees between an essentially vertical orientation in which its foot support end is lowermost, and an inclined position in which the elevation of its foot support end is higher than the elevation of its head end.

* * * * *